United States Patent [19]

Camden, Jr. et al.

[11] Patent Number: 4,495,136

[45] Date of Patent: Jan. 22, 1985

[54] MAXIMUM POWER CAPABILITY BLANKET FOR NUCLEAR REACTORS

[75] Inventors: Thomas M. Camden, Jr., Apollo; William L. Orr, Ligonier, both of Pa.

[73] Assignee: Westinghouse Electric Corp., Pittsburgh, Pa.

[21] Appl. No.: 377,227

[22] Filed: May 11, 1982

[51] Int. Cl.³ .................................................. G21C 3/32
[52] U.S. Cl. .................................... 376/172; 376/435; 376/444
[58] Field of Search ................ 376/172, 173, 435, 444

[56] References Cited

U.S. PATENT DOCUMENTS

| | | |
|---|---|---|
| 2,841,545 | 7/1958 | Zinn. |
| 3,151,029 | 9/1964 | Schwoerer ........................ 376/173 |
| 3,285,821 | 11/1966 | Brubaker ............................ 376/173 |
| 3,335,060 | 8/1967 | Diener ................................ 376/173 |
| 3,351,532 | 11/1967 | Raab, Jr. et al. . |
| 3,658,643 | 4/1972 | Spenke . |
| 3,671,392 | 6/1972 | Beaudoin et al. . |
| 3,745,069 | 7/1973 | Sofer et al. . |
| 3,795,579 | 3/1974 | Chenal et al. ...................... 376/435 |
| 3,802,995 | 4/1974 | Fritz et al. ......................... 376/435 |
| 3,957,575 | 5/1976 | Fauth, Jr. et al. ................. 376/173 |
| 4,123,328 | 10/1978 | Radkowsky et al. ............... 376/435 |
| 4,235,669 | 11/1980 | Burgess et al. .................... 376/435 |

FOREIGN PATENT DOCUMENTS 1539994 12/1969 Fed. Rep. of Germany ...... 376/444

Primary Examiner—Harvey E. Behrend
Attorney, Agent, or Firm—W. D. Palmer

[57] ABSTRACT

A blanket assembly for a nuclear reactor core perimeter region having at least two regions within the assembly of different H/U ratios and rod enrichments.

10 Claims, 6 Drawing Figures

MAXIMUM POWER CAPABILITY BLANKET FOR NUCLEAR REACTORS

BACKGROUND OF THE INVENTION

This invention relates to an improved radial blanket for the cores of nuclear reactors, particularly pressurized water reactors (PWR).

Nuclear reactors have a grouping of fuel assemblies in an array termed the core. The fuel assemblies each comprise an array of cylindrical rods containing fissile fuel. Energy is produced in the reactor by neutron-induced fission reactions in the fuel.

The array of fuel assemblies forms a structure which is approximately a right circular cylinder. The fuel assemblies located on the perimeter of the core may have characteristics which in the industry cause these assemblies to be termed "radial blanket" assemblies.

The application of radial blankets of fertile material to the periphery of PWR cores has been studied extensively. The principal goal of conventional blankets has been to capture neutrons that would otherwise have escaped the fuel core in fertile material, thereby producing fissile material. The impediment to this strategy which has prohibited the use of these blankets in PWR's to date is power peaking that results inboard in the core. This power peaking is the result of displacing peripheral fuel assemblies of enriched fuel with low reactivity, fertile material. The conclusion which has been reached repeatedly in the industry is that the resulting power peaking is unacceptable. Other attempts to successfully install radial blankets in PWR's have employed radical fuel design or core structure changes, e.g., installing fertile material in the zone between a core baffle and barrel or reducing the fuel assembly size by a factor of four to permit installation of smaller fertile assemblies around the periphery. These alternatives are accompanied by departures from existing core designs which are not merited by the resulting neutron utilization improvement. The application of radial blankets in boiling water reactors (BWR's) has been successful primarily due to the already reduced size of BWR fuel assemblies (about ¼ of PWR size).

Consequently, it is desired to provide a design for a blanket assembly that can be used to capture neutrons at the core perimeter, reducing core leakage, with an acceptable core power peaking factor.

SUMMARY OF THE INVENTION

A blanket assembly design is provided which has a plurality of zones of rods within the assembly, each zone being defined as having rods of a different diameter and having fuel of a different uranium enrichment.

DESCRIPTION OF THE PREFERRED EMBODIMENT

Figure 1:
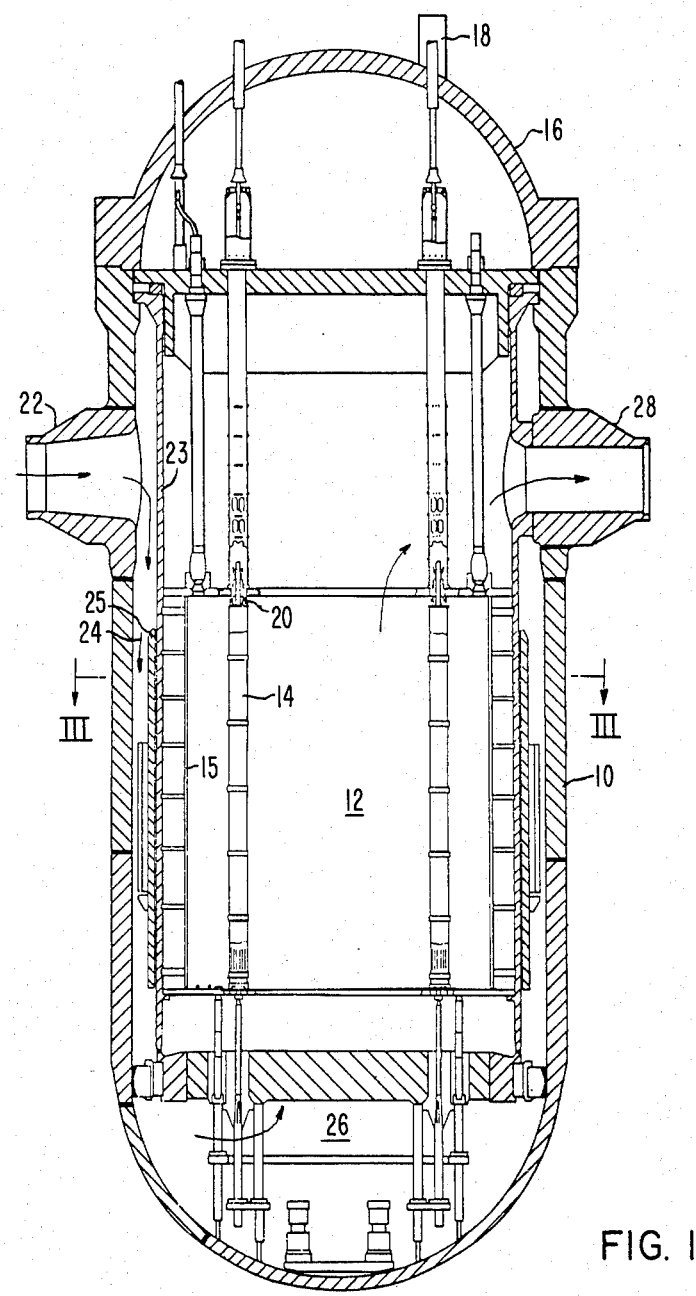
FIG. 1 is a schematic of a PWR.

Referring to FIG. 1, there is shown a reactor vessel 10 housing a nuclear reactor core 12. The core 12 includes a plurality of parallel and coextending bundled-rod fuel elements 14 supported vertically by a structure within the vessel 10. The vessel 10 is sealed at the top by a head 16 from which there is supported control element drive mechanism 18 which selectively position control elements 20 above and within some of the fuel elements 14. During operation a reactor coolant fluid, such as water, is typically pumped into the vessel through a plurality of inlet nozzles 22, passes downward through an annular region 24 between the vessel and a core barrel 23 and thermal shield 25 turns in the vessel lower plenum 26, passes upwardly through the core 12, and exits through a plurality of outlet nozzles 28. The heat energy which the core imparts to the coolant is transferred in heat transfer apparatus (not shown) typically for the ultimate purpose of electrical power generation.

Figure 2:
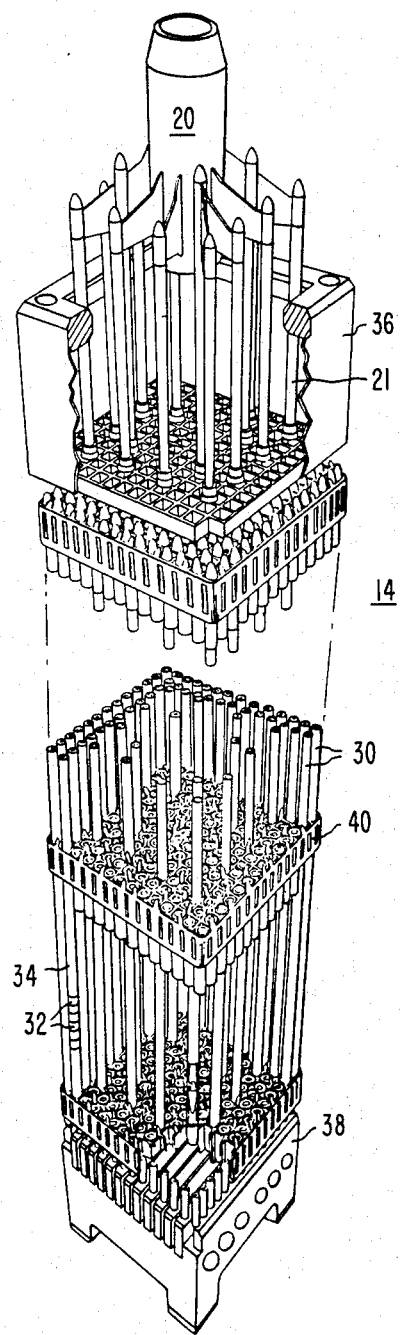
FIG. 2 is a schematic of a PWR prior art fuel assembly.

A typical fuel element 14 of the bundled-rod type is shown in greater detail in FIG. 2. It includes a plurality of parallel and coextending fuel rods 30, each of which includes nuclear fuel pellets 32 stacked within a sealed metallic cladding 34. The fuel rods 30 are primarily supported by upper 36 and lower 38 nozzles and by grid structures 40 spaced along the element length. The element is shown receiving a control element 20 of the "spider" type, including a plurality of cylindrical control rods 21, although plates, bars, singular rods, and so forth, can be used with varying element configurations. The control element 20 is comprised of a material having a high neutron absorption cross section, such as boron carbide, tantalum, a combination of silver-indium and cadmium, or many others well known in the art. It is to be understood that while an open-lattice or grid-type fuel element is shown, the teachings herein are applicable to other fuel element structures; including those referred to as ducted elements used in many reactor types, such as liquid metal cooled fast breeder reactors.

Figure 3:
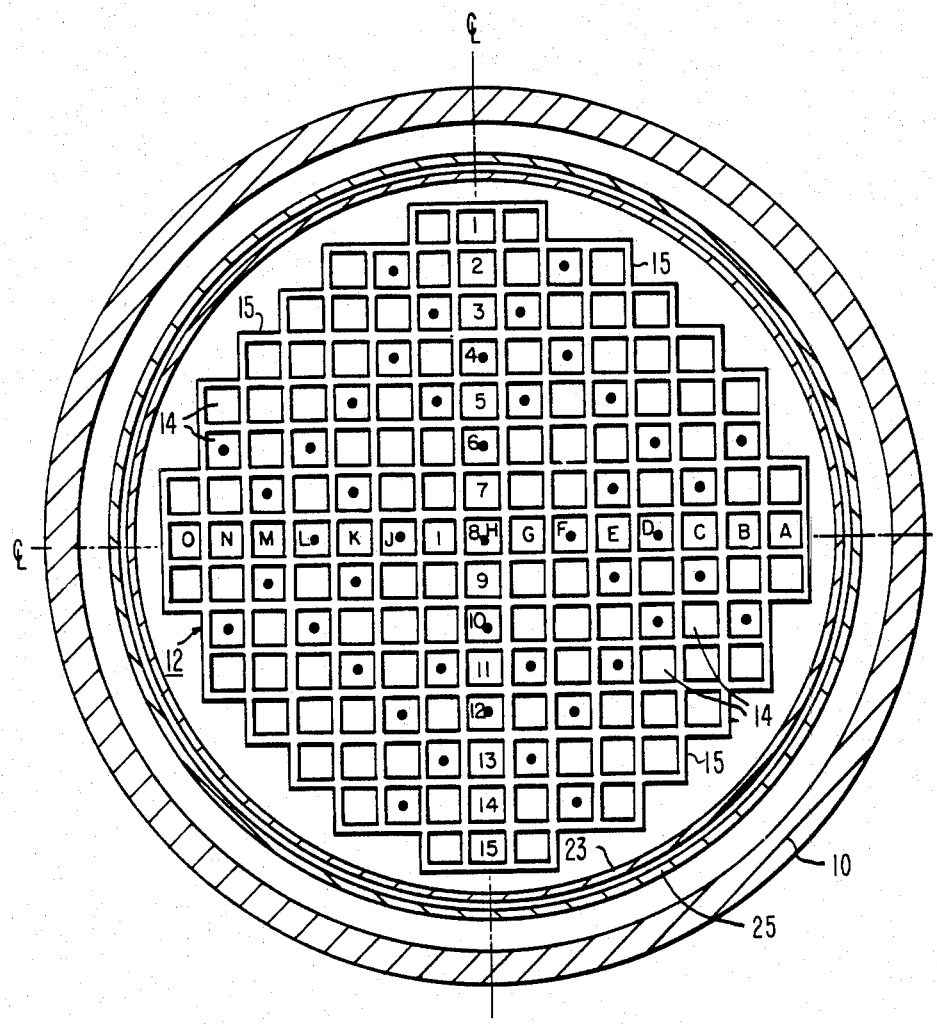
FIG. 3 is a profile of a PWR core.

FIG. 3 shows that the fuel elements 14 are disposed in core locations in a regularly patterned array. The letters A through O and numerals 1 through 15 are herein utilized to reference a given core position (A-1, B-2, etc.). Core 12 is surrounded by a core baffle plate 15 which serves to channel coolant flow.

Figure 4:
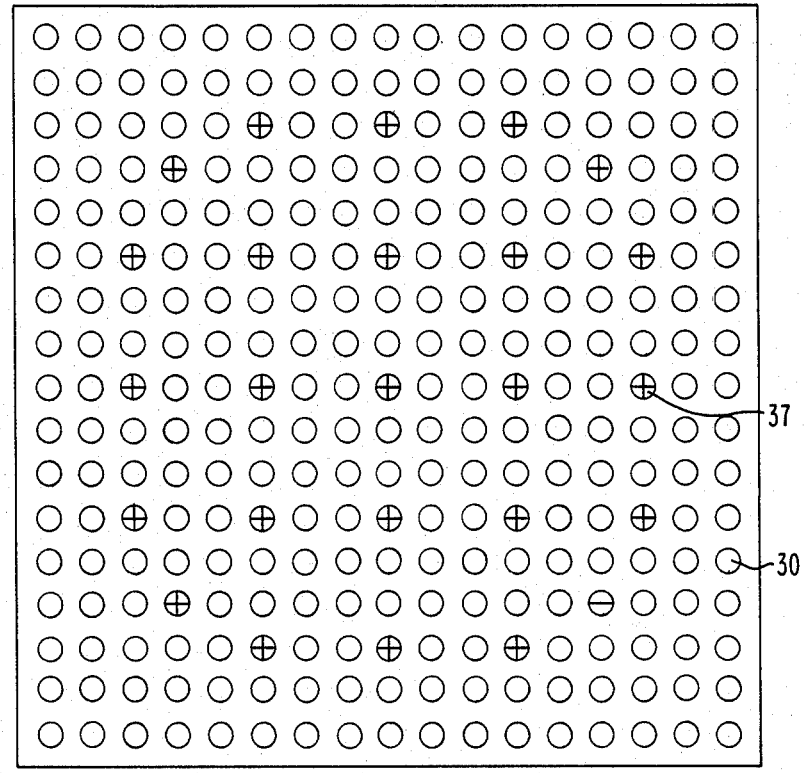
FIG. 4 is a profile schematic of a PWR prior art fuel assembly.

FIG. 4 is a schematic of a prior art fuel assembly having a 17 by 17 array of fuel rods 30.

This invention is to provide a maximum power capability blanket (MPC) assembly for core perimeter locations. Inspection of FIG. 3 shows there to be assemblies which present one face to core baffle plate 15 (see for example locations A-8, B-6, F-2 in FIG. 3) and assemblies which present two faces to core baffle plate 15 (see for example locations A-7, B-5, E-2 in FIG. 3).

The MPC blanket design is to substantially reduce neutron leakage with a minimum power peaking penalty. This accomplishment is provided through improved neutron reflection into adjacent enriched fuel within a blanket assembly of current PWR size which has both fertile zones and enriched zones. The MPC blanket assembly is placed at the periphery and remains at the periphery throughout life. To improve the utilization of the enriched fuel in this peripheral area, the enriched zone has a high H/U lattice, where this H/U symbol is defined as the ratio between the hydrogen to the uranium characteristic of the rod array.

The improved reflection is provided by low H/U fertile blanket zones. The reduction of water (H) in the fertile zone maximizes the flux of reflected neutrons in the adjacent enriched fuel. The fertile material also performs the role of a traditional blanket, i.e., capturing escaping neutrons with fertile captures and subsequently producing power within the fertile zone.

One likely reason that multiple zone enrichment concepts have not been employed as radial blankets in the past is that one inevitably traps enriched fuel in an area of low utilization. The MPC blanket improves fuel utilization through appropriate H/U zoning. This same utilization improvement also provides a general flattening of power throughout the core which tends to offset the usual radial power peaking associated with radial blankets.

Figure 5:
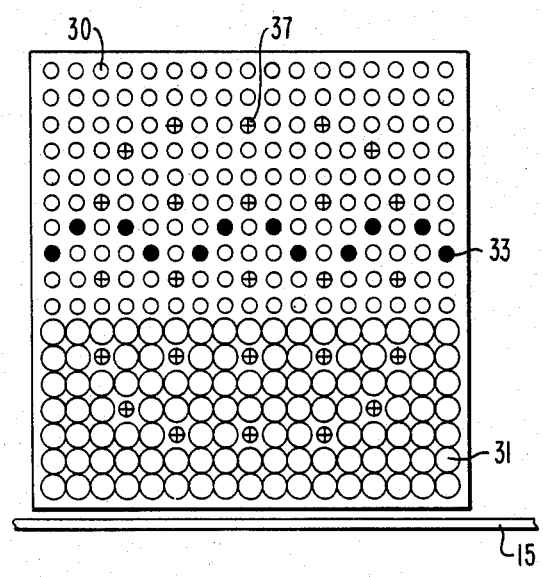
FIG. 5 is a profile schematic of a first embodiment of the invented blanket assembly.
Figure 6:
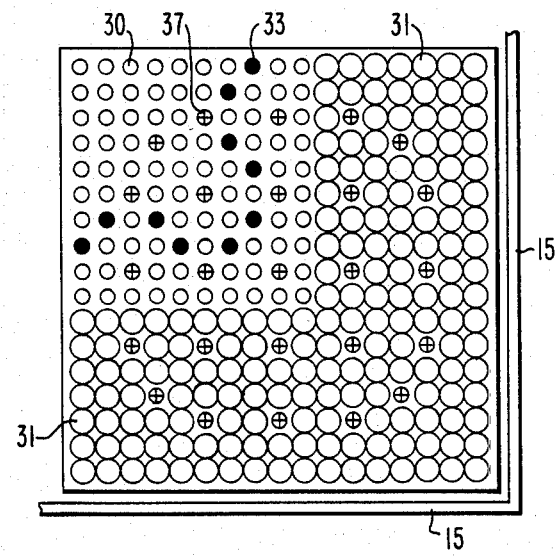
FIG. 6 is a profile schematic of a second embodiment of the invented blanket assembly.

Specific first and second embodiments appropriate to use with non-blanket fuel of the type shown in FIG. 4 are shown in FIGS. 5 and 6. FIG. 5 shows the embodiment for location in "one-face-to-baffle" locations while FIG. 6 is the embodiment for "two-faces-to-baffle" locations.

In these designs there are only two enrichments and two fuel rod sizes. The smaller fuel rod 34 is the same fuel rod 30 used in the rest of the core, and the presence of these smaller fuel rods 30 defines the area of the "enriched zone", which has a high H/U ratio. A low H/U in the fertile zone is obtained through oversized fertile fuel rods 31, the presence of which define the fertile zone.

The H/U ratio in the enriched zone is accomplished by removing fuel rods 33 near the boundary of the fertile zone. The importance of the neutron reflection from the fertile zone can be deduced by comparing the results of cores using this configuration with and without an H/U adjustment in the fertile zone. The oversized rods by themselves represent a drop in cell reactivity of about 10% $\Delta\rho$ compared to the smaller fuel rod cell. The impact of such a change by itself would be to lower core reactivity about 0.5% $\Delta\rho$ and shift power substantially toward the middle of the core. The reflective benefits of the low H/U zone not only overcome this significant disadvantage but raise core reactivity about 0.1% $\Delta\rho$ and draw power away from the core center to the adjacent enriched fuel zone.

It should also be noted that the configurations in FIGS. 5 and 6 have incorporated variable enrichment and H/U zoning without a major structural redesign of the reference design shown in FIG. 4. There has been no change to the non-blanket assemblies and no change to the structure or arrangement of core internals. A side benefit of the configuration shown here is a reduction in fluence to the core vessel of about 50% over current fuel designs, since neutron leakage is reduced by approximately this amount.

In FIGS. 4, 5 and 6 circles 37 represent control rod guide thimble locations.

We claim:

1. In combination with the core for a nuclear pressurized water reactor having a core barrel which encloses a plurality of vertically oriented and closely spaced elongated fuel assemblies, each of said fuel assemblies having a generally square cross-sectional configuration with four axial exterior faces, the combined array of said fuel assemblies having the general configuration of a right circular cylinder to the extent permitted by the square configuration of those fuel assemblies which are positioned at the periphery of said combined fuel assembly array, a portion of said peripherally positioned fuel assemblies of said array having one axial peripheral face which forms a portion of the periphery of said combined fuel assembly array, the remainder of said peripherally positioned fuel assemblies of said array having two axial peripheral faces which form a portion of the periphery of said combined fuel assembly array, a flow baffle closely surrounding said axial peripheral faces of said fuel assemblies which form the outer periphery for said combined fuel assembly array to direct the flow of coolant fluid upwardly through said fuel assembly array during operation of said reactor, those of said fuel assemblies which are positioned interiorly within said array each comprising a plurality of regularly spaced parallel and coextensive relatively small diameter fuel rods each of which comprises fissile pellets stacked within a sealed metallic cladding, said small diameter fuel rods being primarily supported by upper and lower nozzles and by grid structures spaced along the length of said rods, each of said fuel assemblies which are interiorly positioned within said combined array having a high H/U ratio, and a relatively small proportion of control rod thimbles spaced among said small diameter fuel rods; the improved constructions for said fuel assemblies which are peripherally positioned in said combined array;

said improved peripherally positioned fuel assemblies each incorporating two different fuel rod designs, the first of said fuel rod designs being the same as the fuel rod designs used in said fuel assemblies which are interiorly positioned within said combined array, and the second of said fuel rod designs differing from said first fuel rod designs in that the diameter of said second fuel rod designs is larger than that of said first fuel rods and the pellets of said second fuel rods comprise fertile material with those portions of said peripherally positioned assemblies which incorporate said second fuel rods having a low H/U ratio, and a relatively small proportion of control rod thimbles spaced among said fuel rods of said peripherally positioned arrays;

said first fuel rod designs and said second fuel rod designs positioned in separate discrete locations within each of said peripherally positioned fuel assemblies, said second fuel rods positioned nearest the peripherally positioned axial faces of said fuel assemblies which form the periphery of said combined array, and said first design fuel rods positioned furthest away from the peripherally positioned axial faces of said fuel assemblies which form the periphery of said combined array.

2. The combination as specified in claim 1, wherein said peripherally positioned fuel assemblies which have only one axial peripheral face forming a portion of the periphery of said combined fuel assembly array each have said second fuel rods positioned in a discrete location abutting said one axial peripheral face and aligned in rows parallel to said one axial peripheral face.

3. The combination as specified in claim 1, wherein said peripherally positioned fuel assemblies comprise locations for seven rows of said second fuel rods which parallel said one axial face, each of said seven rows having locations for seventeen of said second fuel rods except for a minor proportion of control rod thimble locations, and the remainder of said peripherally positioned fuel assemblies have locations for ten rows of said first fuel rods, and each of said ten rows having locations for seventeen of said first fuel rods except for a minor proportion of control rod thimble locations.

4. The combination as specified in claim 1, wherein said peripherally positioned fuel assemblies which have two axial peripheral faces forming a portion of the periphery of said combined fuel assembly array have said second fuel rods positioned in discrete locations aligned in rows abutting both of said axial peripheral faces.

5. The combination as specified in claim 4, wherein said peripherally positioned fuel assemblies comprise locations for seven rows of said second fuel rods positioned parallel to both of said axial peripheral faces, each of said seven rows having locations for seventeen of said second fuel rods except for a minor proportion of control rod thimble locations, and the remainder of said peripherally positioned fuel assemblies have locations for ten rows of said first fuel rods, and each of said ten rows having locations for ten of said first fuel rods except for a minor proportion of control rod thimble locations.

6. In combination with the core for a nuclear pressurized water reactor having a core barrel which encloses a plurality of vertically oriented and closely spaced elongated fuel assemblies, each of said fuel assemblies having a generally square cross-sectional configuration with four axial exterior faces, the combined array of said fuel assemblies having the general configuration of a right circular cylinder to the extent permitted by the square configuration of those fuel assemblies which are positioned at the periphery of said combined fuel assembly array, a portion of said peripherally positioned fuel assemblies of said array having one axial peripheral face which forms a portion of the periphery of said combined fuel assembly array, the remainder of said peripherally positioned fuel assemblies of said array having two axial peripheral faces which form a portion of the periphery of said combined fuel assembly array, a flow baffle closely surrounding said axial peripheral faces of said fuel assemblies which form the outer periphery for said combined fuel assembly array to direct the flow of coolant fluid upwardly through said fuel assembly array during operation of said reactor, those of said fuel assemblies which are positioned interiorly within said array each comprising a plurality of regularly spaced parallel and coextensive relatively small diameter fuel rods each of which comprises fissile pellets stacked within a sealed metallic cladding, said small diameter fuel rods being primarily supported by upper and lower nozzles and by grid structures spaced along the length of said rods, each of said fuel assemblies which are interiorly positioned within said combined array having a high H/U ratio, and a relatively small proportion of control rod thimbles spaced among said small diameter fuel rods; the improved constructions for said fuel assemblies which are peripherally positioned in said combined array;

said improved peripherally positioned fuel assemblies each incorporating two different fuel rod designs, the first of said fuel rod designs being the same as the fuel rod designs used in said fuel assemblies which are interiorly positioned within said combined array, and the second of said fuel rod designs differing from said first fuel rod designs in that the diameter of said second fuel rod designs is larger than that of said first fuel rods and the pellets of said second fuel rods comprise fertile material with those portions of said peripherally positioned assemblies which incorporate said second fuel rods having a low H/U ratio, and a relatively small proportion of control rod thimbles spaced among said fuel rods of said peripherally positioned arrays;

said first fuel rod designs and said second fuel rod designs positioned in separate discrete locations within each of said peripherally positioned fuel assemblies, said second fuel rods positioned nearest the axial faces of said peripherally positioned assemblies which form the periphery of said combined array, said first design fuel rods positioned furthest away from the axial faces of said peripherally positioned fuel assemblies which form the periphery of said combined array, and a minor proportion of fuel rod locations which are designed to be occupied by said first fuel rods being left open to increase the H/U ratio.

7. The combination as specified in claim 6, wherein said peripherally positioned fuel assemblies which have only one axial peripheral face forming a portion of the periphery of said combined fuel assembly array each have said second fuel rods positioned in a discrete location abutting said one axial peripheral face and aligned in rows parallel to said one axial peripheral face.

8. The combination as specified in claim 7, wherein said peripherally positioned fuel assemblies comprise locations for seven rows of said second fuel rods which parallel said one axial face, each of said seven rows having locations for seventeen of said second fuel rods except for a minor proportion of control rod thimble locations, and the remainder of said peripherally positioned fuel assemblies have locations for ten rows of said first fuel rods, and each of said ten rows having locations for seventeen of said first fuel rods except for a minor proportion of control rod thimble locations.

9. The combination as specified in claim 6, wherein said peripherally positioned fuel assemblies which have two axial peripheral faces forming a portion of the periphery of said combined fuel assembly array have said second fuel rods positioned in discrete locations aligned in rows abutting both of said axial peripheral faces.

10. The combination as specified in claim 9, wherein said peripherally positioned fuel assemblies comprise locations for seven rows of said second fuel rods positioned parallel to both of said axial peripheral faces, each of said seven rows having locations for seventeen of said second fuel rods except for a minor proportion of control rod thimble locations, and the remainder of said peripherally positioned fuel assemblies have locations for ten rows of said first fuel rods, and each of said ten rows having locations for ten of said first fuel rods except for a minor proportion of control rod thimble locations.

* * * * *